United States Patent [19]

Fujisaki et al.

[11] Patent Number: 4,573,745

[45] Date of Patent: Mar. 4, 1986

[54] CARBON FIBER REINFORCED PLASTIC SPOKE PLATE

[75] Inventors: Masaru Fujisaki, Tokyo; Tetsuo Tsuchida, Saitama; Yoichi Sasajima, Osaka; Hiroshisa Ito, Osaka; Masahiro Morita, Osaka, all of Japan

[73] Assignees: Honda Giken Kogyo Kabushiki Kaisha; Sumitomo Electric Industries, Ltd., both of Japan

[21] Appl. No.: 453,864

[22] Filed: Dec. 28, 1982

[30] Foreign Application Priority Data

Jan. 7, 1982 [JP] Japan ................................. 57-1658

[51] Int. Cl.$^4$ .......................... B60B 5/02; B32B 5/12
[52] U.S. Cl. .................................. 301/63 PW; 301/73; 428/112; 428/408
[58] Field of Search .......... 301/63 PW, 63 DS, 64 R, 301/54, 55, 62, 73, 74, 56–59; 428/109–112, 408, 367

[56] References Cited

U.S. PATENT DOCUMENTS

| 1,308,849 | 7/1919 | Lachman | 301/62 |
| 1,693,360 | 11/1928 | Baker | 301/64 R X |
| 2,428,325 | 9/1947 | Collins | 428/114 X |
| 3,369,843 | 2/1968 | Prew | 301/63 PW |
| 3,691,000 | 9/1972 | Kalnin | 428/114 |
| 4,023,801 | 5/1977 | VanAuken | 428/110 X |
| 4,030,754 | 6/1977 | Merlette | 301/63 PW X |
| 4,153,267 | 5/1979 | Hilber | 301/74 X |
| 4,177,306 | 12/1979 | Schulz et al. | 428/112 X |
| 4,294,490 | 10/1981 | Woelful | 301/63 PW |
| 4,413,860 | 11/1983 | Prescott | 301/63 PW |

FOREIGN PATENT DOCUMENTS

| 1939910 | 2/1971 | Fed. Rep. of Germany | 301/63 PW |
| 2640843 | 3/1978 | Fed. Rep. of Germany | 301/63 PW |
| 503926 | 4/1920 | France | 301/73 |

Primary Examiner—Robert B. Reeves
Assistant Examiner—Russell D. Stormer
Attorney, Agent, or Firm—Sughrue, Mion, Zinn, Macpeak and Seas

[57] ABSTRACT

A spoke plate is made from a lamination of an odd number of carbon fiber fabric layers having fibers extending in both horizontal and longitudinal directions and alternating with an even number of fiber layers having fibers extending only in the longitudinal direction.

2 Claims, 7 Drawing Figures

CARBON FIBER REINFORCED PLASTIC SPOKE PLATE

BACKGROUND OF THE INVENTION

This invention relates to a spoke plate for a vehicle, which is made of carbon fiber reinforced plastic (hereinafter referred to merely as "CFRP", when applicable) which is light and durable.

CFRP which is set by a thermosetting resin such as epoxy resin or polyester resin has both a high strength and high modulus of elasticity, is resistive against acid and alkali, has a high fatigue limit, is lightweight and is excellent in its vibration damping characteristics. Thus, such a CFRP has a wide range of applications as a light structural material.

CFRP parts have been extensively employed in the field of aircraft, since weight reduction is essential. However, in the field of vehicles, especially in the field of automobiles, such CFRP parts are employed not as structural members but merely as auxiliary members in some sports cars or racing cars.

It has generally been the case that conventional CFRP products vary greatly in quality and are low in reliability because the fibers are not sufficiently bonded to the resin. However, it has recently become possible to obtain a CFRP which is sufficiently stable as a structural material owing to research on the interface between fiber and resin, studies of the manufacturing method, improvements in manufacturing equipment, improvements in manufacturing circumstances or environments, and progress in the non-destructive inspection method.

SUMMARY OF THE INVENTION

It is a feature of this invention that a CFRP spoke plate is provided in which a number of layers having carbon fibers extended in one direction are laid in lamination with the fibers extending in the longitudinal direction thereof in which a large weight load is applied. These layers are sandwiched between carbon fiber fabric layers having fibers extending in both horizontal and longitudinal directions, so that the strength and modulus of elasticity (or rigidity) in the longitudinal direction are much greater than in the lateral direction. The fabric layers form both surfaces of the spoke plate so that the latter will maintain its integrity during machining. With such a construction, the weight of the plate is smaller than that of an aluminum alloy spoke plate while the strength and modulus of elasticity (or rigidity) are higher, and the wall thickness is decreased.

BRIEF DESCRIPTION OF THE DRAWINGS

The invention will now be described with reference to the accompanying drawings in which.

DETAILED DESCRIPTION OF THE PREFERRED EMBODIMENTS

Figure 1A:
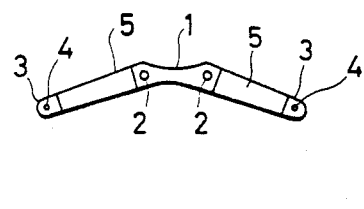
FIGS. 1(a) and 1(b) are a front view and a side view of a spoke plate, respectively.
Figure 1B:
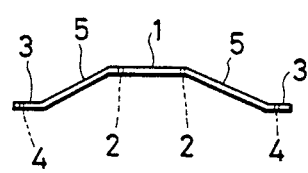
Figure 2A:
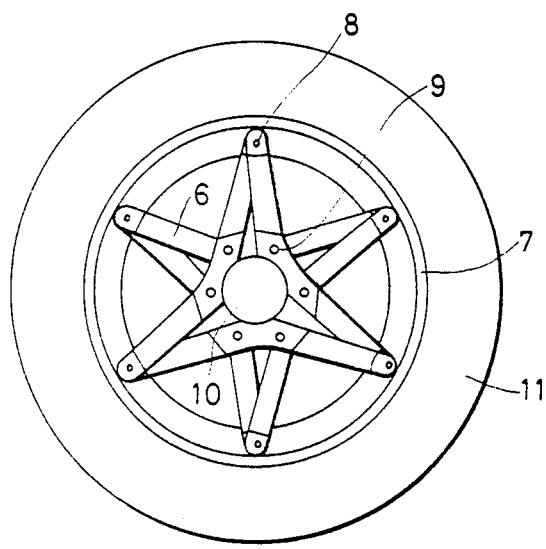
FIGS. 2(a) and 2(b) are front and sectional views, respectively, of the spoke plates mounted on the rim and hub of a wheel.
Figure 2B:
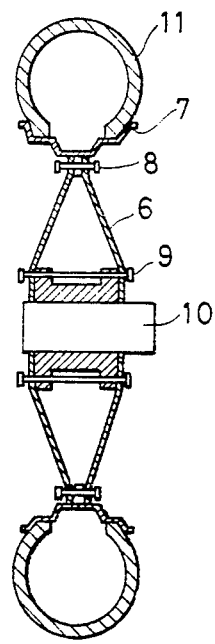

FIGS. 1(a) and 1(b) show a conventional spoke plate. In FIGS. 1(a) and 1(b), reference numeral 1 designates a first plate portion for serving as a horizontal hub mounting surface; 3, second plate portions serving as horizontal rim mounting surfaces; 5, third plate portions serving as sloped surfaces for connecting the first and second plate portions; and 2 and 4, mounting holes. FIGS. 2(a) and 2(b) show the spoke plates mounted on the rim and the hub. More specifically, the spoke plates 6 are mounted on the rim 7 with bolts 8 and on the hub 10 with bolts 9. A plurality of spoke plates mounted on the rim 7 and the hub 10 cooperate with a tire 11 to form a wheel.

The spoke plates are used to support the weight of the vehicle. Furthermore, a large bending load and a large tensile load are longitudinally applied to the spoke plates, for instance when the vehicle is quickly braked or during cornering. Therefore, it is necessary that each spoke plate have a high strength and high modulus of elasticity (or rigidity). One example of the materials which are available for spoke plates is aluminum alloy. The characteristic data of an aluminum alloy spoke plate are as indicated in Table 1:

TABLE 1

| Item | Characteristic Data |
| --- | --- |
| Tensile strength | 25 Kg/mm$^2$ |
| Tensile elastic constant | 7000 Kg/mm$^2$ |
| Specific gravity | 2.7 |
| Weight | 85 g |
| Wall thickness | 2.5 mm |

The invention utilizes the advantages of CFRP in that (1) CFRP is lightweight and has a high strength, (2) it can be laminated as desired, and (3) it can be shaped as required. When the CFRP is laminated in such a manner that the fibers are extended only in the longitudinal direction in which the weight load is large, the strength and modulus of elasticity (or rigidity) in the longitudinal direction are made much larger than those in the lateral direction. The spoke plate of the invention is lighter than an aluminum alloy spoke plate, and the strength and modulus of elasticity (rigidity) are larger than those of the aluminum alloy spoke plate, while the wall thickness is smaller.

Figure 3:
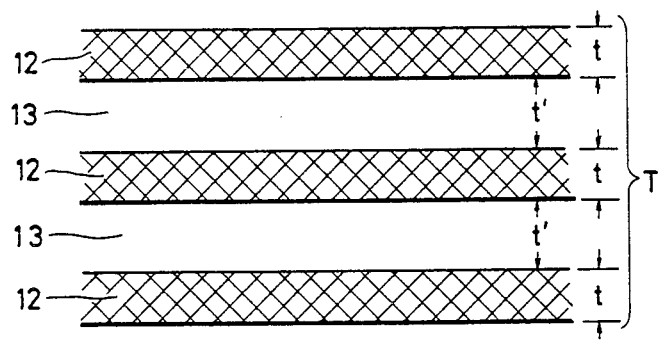
FIGS. 3 and 4 are explanatory diagrams showing the lamination structures, in the longitudinal direction, of CFRP spoke plates according to first and second embodiments of this invention.

A first embodiment of this invention will be described with reference to FIG. 3. FIG. 3 shows the lamination structure of a CFRP spoke plate according to a first embodiment of the invention. In FIG. 3, reference numeral 12 designates first layers of carbon fiber fabric, 0.4 mm in thickness. In the carbon fiber fabric, the number of carbon fibers in the horizontal direction is equal to that of carbon fibers in the vertical direction. The fibers are laid both in the longitudinal direction and in the lateral direction of the spoke plate. Further in FIG. 3, reference numeral 13 designates second layers in which carbon fibers are extended only in one direction. Each second layer 13 includes three layers each 0.2 mm in thickness and laid one on another such that their carbon fibers lie in one direction, preferably the longitudinal direction of the plate. In FIG. 3, t=0.4 mm, t'=0.6 mm, and T=2.4 mm.

In the above-described lamination structure, two fabric layers form both surfaces of the spoke plate, and one fabric layer is provided between the two fiber layers 13. Accordingly, the spoke plate according to the invention is advantageous in that, when the bolt holes 2 and 4 are drilled as shown in FIG. 1, the surfaces are not cracked or torn off. Further, the spoke plate according to the invention is not bent or deformed by the thermal residual stress which occurs during shaping. The strength, in the longitudinal direction, of the CFRP spoke plate constructed as described above was 95 $Kg/mm^2$ which is about four times that of the aluminum alloy spoke plate, and the modulus of elasticity was 13500 $kg/mm^2$ which is about twice that of an aluminum alloy spoke plate. The CFRP spoke plate was 2.4 mm in thickness, and weighed only about 50 g.

Figure 5:
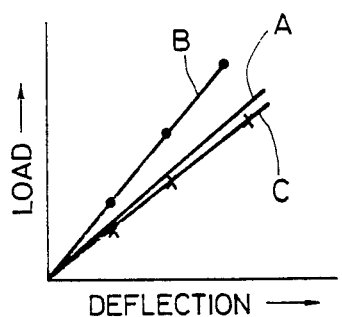
FIG. 5 is a graphical representation indicating load vs. deflection curves of wheels which are made of spoke plates according to the first and second embodiments of the invention and of conventional aluminum alloy spoke plates.

The spoke plates thus fabricated were used to form a wheel as shown in FIGS. 2(a) and 2(b) and deflection of the wheel was measured with the hub fixedly secured and a load applied to the rim. The measured results provided a load vs. deflection curve as shown in FIG. 5 which is excellent when compared with that of a wheel formed with the aluminum alloy spoke plates. In FIG. 5, reference character A corresponds to the case of a wheel made up of aluminum alloy spoke plates (T=2.5 mm), and B corresponds to the case of a wheel made up of the spoke plate shown in FIG. 3 (T=2.4 mm).

Figure 4:
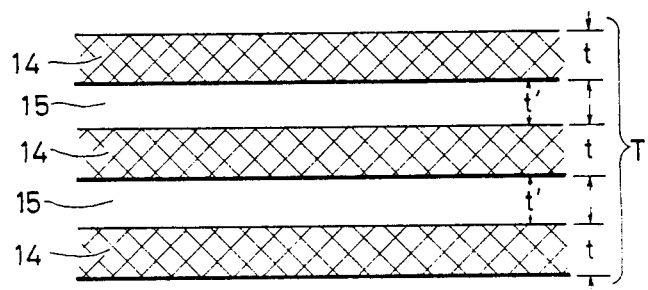

A second embodiment of the invention will be described with reference to FIG. 4. The second embodiment is intended to reduce the wall thickness and accordingly the weight when compared with the spoke plate according to the first embodiment. In FIG. 4, reference numeral 14 designates first layers, i.e. carbon fiber fabric layers, and 15 designates second layers in which carbon fibers lie in one direction. The carbon fibers are extended in the same directions as those in the first embodiment. In FIG. 4, t=0.4 mm, t'=0.4 mm and T=2.0 mm. The strength, in the longitudinal direction, of the CFRP spoke plate constructed as described above was 70 $Kg/mm^2$, and the modulus of elasticity was 11000 $Kg/mm^2$. The load vs. deflection curve of a wheel made up of these spoke plates is substantially similar to that of the wheel made up of the aluminum alloy spoke plates as shown in FIG. 5. In FIG. 5, reference character C designates the load vs. deflection curve of a wheel made up of spoke plates according to the second embodiment. The weight of the CFRP spoke plate was 40 g, which is less than 50% of the weight of the aluminum alloy spoke plate.

As is apparent from the above-described first and second embodiments of the invention, the CFRP spoke plate can be readily manufactured according to a method in which the first and second layers are laid in lamination and are then shaped by hot pressing. The spoke plates of the invention can be manufactured automatically in mass production, thus being substantially uniform in quality and low in manufacturing cost.

What is claimed is:

1. A spoke plate for a vehicle, said spoke plate being of the type for connecting a hub with a surrounding rim and having a first plate portion for connection to said hub, at least one second plate portion for connection to said rim and a third portion extending in a longitudinal direction between said first and second portions and integrally formed with said first and second plate portions, said spoke plate being made of a carbon fiber reinforced plastic material comprising an odd number of first carbon fiber layers each including fibers extending in said longitudinal direction as well as fibers extending in a second direction, and an even number of second carbon fiber layers arranged alternatively with said first layers and each having fibers extending only in said longitudinal direction, whereby the strength and modulus of elasticity in the longitudinal direction of said spoke plate is larger than the strength and modulus of elasticity in a lateral direction of said spoke plate.

2. A spoke plate as claimed in claim 1, wherein said second direction is substantially orthogonal to said first direction.

* * * * *